(12) United States Patent
Redekop (10) Patent No.: US 8,684,649 B2
(45) Date of Patent: Apr. 1, 2014

(54) GRAIN CART

(76) Inventor: Johan Redekop, Winkler (CA)

( * ) Notice: Subject to any disclaimer, the term of this patent is extended or adjusted under 35 U.S.C. 154(b) by 287 days.

(21) Appl. No.: 13/158,741

(22) Filed: Jun. 13, 2011

(65) Prior Publication Data

US 2012/0315112 A1    Dec. 13, 2012

(51) Int. Cl.
 *B62D 9/00* (2006.01)
 *B62D 37/00* (2006.01)

(52) U.S. Cl.
 USPC .............................. 414/21; 280/144; 280/494

(58) Field of Classification Search
 USPC .............. 177/136; 180/24.01, 408, 411, 419;
  280/100, 124.178, 137.5, 137.501,
  280/400, 426, 442, 443, 444, 445, 455.1,
  280/493, 494, 6.154, 687, 89.1, 91.1,
  280/93.512, 98; 298/24, 27; 414/21, 335,
  414/523, 526
 See application file for complete search history.

(56) References Cited

U.S. PATENT DOCUMENTS

| | | | | |
|---|---|---|---|---|
| 2,842,377 A * | 7/1958 | Ronning | ...................... | 280/687 |
| 3,309,097 A * | 3/1967 | Seeber | ...................... | 280/5.508 |
| 3,321,035 A * | 5/1967 | Tarpley | ...................... | 177/136 |
| 3,430,975 A * | 3/1969 | Wolf | ............................. | 280/103 |
| 3,554,576 A * | 1/1971 | Parker | ................... | 280/124.113 |
| 3,712,675 A * | 1/1973 | Schoenwald | ................... | 298/10 |
| 3,857,608 A * | 12/1974 | Norton et al. | ............... | 298/35 M |
| 4,000,914 A * | 1/1977 | Wragg | ........................... | 280/682 |
| 5,022,673 A * | 6/1991 | Sekino et al. | ........... | 280/124.138 |
| 5,167,581 A * | 12/1992 | Haag | .............................. | 460/114 |
| 5,340,142 A | 8/1994 | Kuhns | | |
| 5,477,937 A * | 12/1995 | Chagnon | .................... | 180/24.01 |
| 5,570,754 A * | 11/1996 | Stimson | ........................ | 180/234 |
| 5,769,502 A * | 6/1998 | Bettini | ......................... | 298/17 S |
| 5,997,013 A * | 12/1999 | Claxton | ..................... | 280/6.154 |
| 6,203,027 B1 * | 3/2001 | Ishikawa et al. | ............ | 280/6.154 |
| 6,488,114 B1 | 12/2002 | McMahon et al. | | |
| 6,497,546 B2 * | 12/2002 | Wood et al. | ................... | 414/523 |
| 6,789,810 B2 * | 9/2004 | Strong | .................... | 280/124.128 |
| 7,631,881 B2 * | 12/2009 | Broemeling | ............... | 280/5.521 |
| 2008/0048414 A1* | 2/2008 | Van Mill et al. | .............. | 280/426 |
| 2010/0052289 A1* | 3/2010 | Frey et al. | ..................... | 280/442 |

* cited by examiner

*Primary Examiner* — Gregory Adams
(74) *Attorney, Agent, or Firm* — Ryan W. Dupuis; Kyle R. Satterthwaite; Ade & Company Inc (57) ABSTRACT

A grain cart includes front wheels steerable about respective upright and rearwardly inclined steering axes arranged in a trailing self-steering configuration and rear wheel assemblies which are fixed in a forward working direction. The front wheel assemblies are fixed to the main frame of the cart except for the pivotal movement about the steering axes. The rear wheel assemblies are supported on a rear axle support member coupled by a rear suspension to the main frame so as to be arranged for rocking movement about a forward longitudinal axis. The grain cart optionally incorporates a load scale integrally into the main frame, as well as a hitch arm actuator to transfer of some of the load from the grain cart wheels to the towing vehicle by actuating the hitch arm to pivot the hitch arm downward relative to the main frame.

16 Claims, 6 Drawing Sheets

GRAIN CART

FIELD OF THE INVENTION

The present invention relates to a grain cart comprising a hopper for receiving particulate material such as grain therein and a hitch arm for connection to a towing vehicle, and more particularly the present invention relates to a grain cart comprising two pairs of wheels in which one of the pairs of wheels is steerable for better following the towing vehicle. The present invention further relates to a grain cart incorporating an integral weigh scale therein.

BACKGROUND

Grain carts are commonly used for receiving particulate material therein, such as harvested grain for subsequent transfer to another transport vehicle and/or handling equipment and the like. A typical grain cart construction comprises a hopper tank having an open top arranged to receive grain from a combine or the like therein. The hopper is supported on a frame supported on wheels for rolling movement along the ground and includes a hitch arm for connection to the towing vehicle.

For greater capacity, dual axle configurations are known however, such configurations are difficult to steer. U.S. Pat. No. 6,488,114 by McMahon et al. and U.S. Pat. No. 5,340,142 by Kuhns disclose dual axle chassis for grain carts in which one axle is actively steered so that the grain cart better tracks a towing vehicle. In each instance a complex actuation is required to effectively steer the wheels on one of the axles. Furthermore, the required design of the chassis in each instance makes it difficult to incorporate adequate suspension to provide an adequate degree of freedom of the movement of the wheels relative to one another, as well as being difficult to incorporate an integral weigh scale into the design.

SUMMARY OF THE INVENTION

According to one aspect of the invention there is provided a grain cart for connection to a towing vehicle for movement therewith in a forward working direction, the grain cart comprising:

a main frame;

a pair of front wheel assemblies including respective front wheels supported at opposing sides of the main frame so as to be arranged for pivotal movement relative to the main frame about respective upright steering axes;

a hopper supported on the main frame so as to be arranged to receive particulate material therein;

a hitch arm having a front end arranged for connection to a towing vehicle and a rear end supported for pivotal movement relative to the main frame about a substantially horizontal hitch axis oriented perpendicularly to the forward working direction;

a rear axle support member supporting a pair of rear wheel assemblies including respective rear wheels thereon such that the rear wheels are fixed in orientation; and a rear suspension mechanism coupling the rear axle support member to the main frame at a position spaced rearward from the front wheel assemblies such that the rear wheels are oriented for rolling movement in the forward working direction and such that the rear axle support member is generally arranged for rocking movement about a longitudinal axis oriented in the forward working direction relative to the main frame.

By providing a combination of front steerable wheel assemblies together with rear wheels fixed in orientation but supported by a rear suspension that allows rocking movement about a longitudinal axis, the resulting grain cart frame configuration can readily incorporate self steering front wheels and lots of suspension freedom of the rear wheels relative to the front wheels for evenly distributing the load over uneven terrain. The frame design also readily allows incorporating load scales into the design. The addition of a hitch arm actuator to the hitch arm further allows the transfer of some of the load from the grain cart wheels to the towing vehicle by actuating the hitch arm to pivot the hitch arm downward relative to the main frame.

Preferably the front wheels are supported by the respective front wheel assemblies for rolling movement about respective front wheel axes which are spaced rearwardly from the respective upright steering axes such that front wheels are arranged in a trailing self-steering configuration when the grain cart is towed in the forward working direction.

Preferably the steering axes are inclined upwardly and rearwardly.

Preferably there is provided a locking mechanism arranged to selectively lock the front wheel assemblies such that the front wheels are fixed for rolling movement only in the forward working direction.

Preferably the rear suspension mechanism comprises a pair of hydraulic suspension members coupled between the main frame and the rear axle support member at opposing sides of the main frame. When the hydraulic suspension members each comprise a piston received in a cylinder so as to be arranged for linear extension and retraction, preferably the hydraulic suspension members are connected to one another such that extension of a first one of the hydraulic suspension members corresponds to retraction of a second one of the hydraulic suspension members and retraction of the first one of the hydraulic suspension members corresponds to extension of the second one of the hydraulic suspension members.

Preferably each hydraulic suspension member is pivotally coupled at opposing ends to the axle support member and the main frame respectively for relative pivotal movement about respective axes oriented generally in the forward working direction.

Preferably the suspension members are coupled to the main frame by resilient bushing members.

Preferably a linear damper member is coupled between the rear axle support member and the main frame which extends in a generally lateral direction oriented to extend between opposing sides of the main frame.

Preferably the rear axle support member comprises a crossbar supporting the rear wheel assemblies at opposing ends thereof and connecting portion extending forwardly from the crossbar in fixed relation thereto to a front end pivotally connected to the main frame at a location spaced forwardly from the rear suspension members.

Preferably the front end of the connecting portion is coupled to the main frame by a resilient bushing so as to allow relative pivotal movement about the longitudinal axis oriented in the forward working direction.

The grain cart may further comprise a plurality of load cells received between the hopper frame and the main frame and a scale controller in communication with the plurality of load cells so as to be arranged to determine a weight of material in the hopper.

Preferably the hopper frame is connected to the main frame by a plurality of substantially horizontal link members which are pivotally coupled at opposing ends to the hopper frame and the main frame respectively such that the link members provide no support to the hopper frame in a vertical direction.

Preferably the link members are coupled to the hopper frame and the main frame by resilient bushings.

The grain cart may further comprise a hitch actuator comprising a hydraulic piston cylinder connected between the main frame and the hitch arm so as to be arranged to fix orientation of the hitch arm at a selected one of a plurality of angular positions about the horizontal hitch axis which corresponds to a selected inclination of the hitch arm.

In a preferred embodiment the main frame comprises a pair of side rails extending in the forward working direction parallel and spaced apart from one another and a front axle support member spanning in a lateral direction between the side rails and supporting the front wheel assemblies on opposing ends thereof.

Furthermore, in the preferred embodiment the rear axle support member comprises a crossbar extending in the lateral direction and supporting the rear wheel assemblies at opposing ends thereof and a connecting portion extending forwardly from the crossbar to a front end pivotally coupled to the main frame at an intermediate location between the front and rear axle support members. Preferably the linear damper member is coupled between the rear axle support member and one of the side rails of the main frame so as to extend generally in the lateral direction.

The grain cart may further comprise an unloading auger assembly including a tubular housing supporting an auger rotatably therein and a discharge spout at one end of the housing in which the discharge spout is angularly adjustable generally about the tubular housing so as to be arranged for controlling a discharge orientation of the unloading auger assembly.

Preferably the discharge spout comprises a pair of parallel and axially spaced apart end plates and a pair of substantially parallel and spaced apart side plates extending between the end plates to define a discharge opening of the spout therebetween in which:

the side plates are pivotally coupled to the housing such that the side plates are pivotal about respective pivot axes oriented substantially perpendicularly to the end plates; and an actuator is coupled to the side plates such that an orientation of the side plates relative to the tubular housing is controllable by the actuator.

According to a second aspect of the present invention there is provided a grain cart for connection to a towing vehicle for movement therewith in a forward working direction, the grain cart comprising:

a main frame;

a pair of first wheel assemblies including respective first wheels supported at opposing sides of the main frame so as to be arranged for pivotal movement relative to the main frame about respective upright steering axes;

a hopper supported on the main frame so as to be arranged to receive particulate material therein;

a hopper frame supporting the hopper on the main frame;

a hitch arm having a front end arranged for connection to a towing vehicle and a rear end supported for pivotal movement relative to the main frame about a substantially horizontal hitch axis oriented perpendicularly to the forward working direction;

an axle support member supporting a pair of second wheel assemblies including respective second wheels thereon such that the second wheels are fixed in orientation; and a suspension mechanism coupling the axle support member to the main frame at a position spaced in the working direction from the first wheel assemblies such that the second wheels are oriented for rolling movement in the forward working direction and such that the axle support member is generally arranged for rocking movement about a longitudinal axis oriented in the forward working direction relative to the main frame;

a plurality of load cells received between the hopper frame and the main frame; and a scale controller in communication with the plurality of load cells so as to be arranged to determine a weight of material in the hopper.

The hopper frame may be connected to the main frame by a plurality of substantially horizontal link members which are pivotally coupled at opposing ends to the hopper frame and the main frame respectively such that the link members provide no support to the hopper frame in a vertical direction.

According to a further aspect of the present invention there is provided a grain cart for connection to a towing vehicle for movement therewith in a forward working direction, the grain cart comprising:

a main frame;

a pair of first wheel assemblies including respective first wheels supported at opposing sides of the main frame so as to be arranged for pivotal movement relative to the main frame about respective upright steering axes;

a hopper supported on the main frame so as to be arranged to receive particulate material therein;

a hopper frame supporting the hopper on the main frame;

a hitch arm having a front end arranged for connection to a towing vehicle and a rear end supported for pivotal movement relative to the main frame about a substantially horizontal hitch axis oriented perpendicularly to the forward working direction;

an axle support member supporting a pair of second wheel assemblies including respective second wheels thereon such that the second wheels are fixed in orientation; and a suspension mechanism coupling the axle support member to the main frame at a position spaced in the working direction from the first wheel assemblies such that the second wheels are oriented for rolling movement in the forward working direction and such that the axle support member is generally arranged for rocking movement about a longitudinal axis oriented in the forward working direction relative to the main frame; and a hitch actuator comprising a hydraulic piston cylinder connected between the main frame and the hitch arm so as to be arranged to fix orientation of the hitch arm at a selected one of a plurality of angular positions about the horizontal hitch axis which corresponds to a selected inclination of the hitch arm.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a grain cart generally indicated by reference numeral 10. The cart 10 is particularly suited for connection to a towing vehicle for rolling movement therewith across the ground in a forward working direction.

The cart 10 generally comprises a main frame 12 comprised of two side rails 14 extending longitudinally in the forward working direction parallel and spaced apart from one another along opposing sides of the cart. The two side rails 14 are joined by three cross members 16 adjacent the front end, the rear end and centrally at an intermediate location along the rails respectively. The cross members 16 are fixed relative to the side rails to define the fixed structure of the main frame. Each of the cross members 16 tapers downwardly and inwardly in a generally lateral direction of the cart to a central apex which is recessed below the side rails in elevation to define a trough-like configuration for accommodating other components of the grain cart as described in further detail below.

Figure 2:
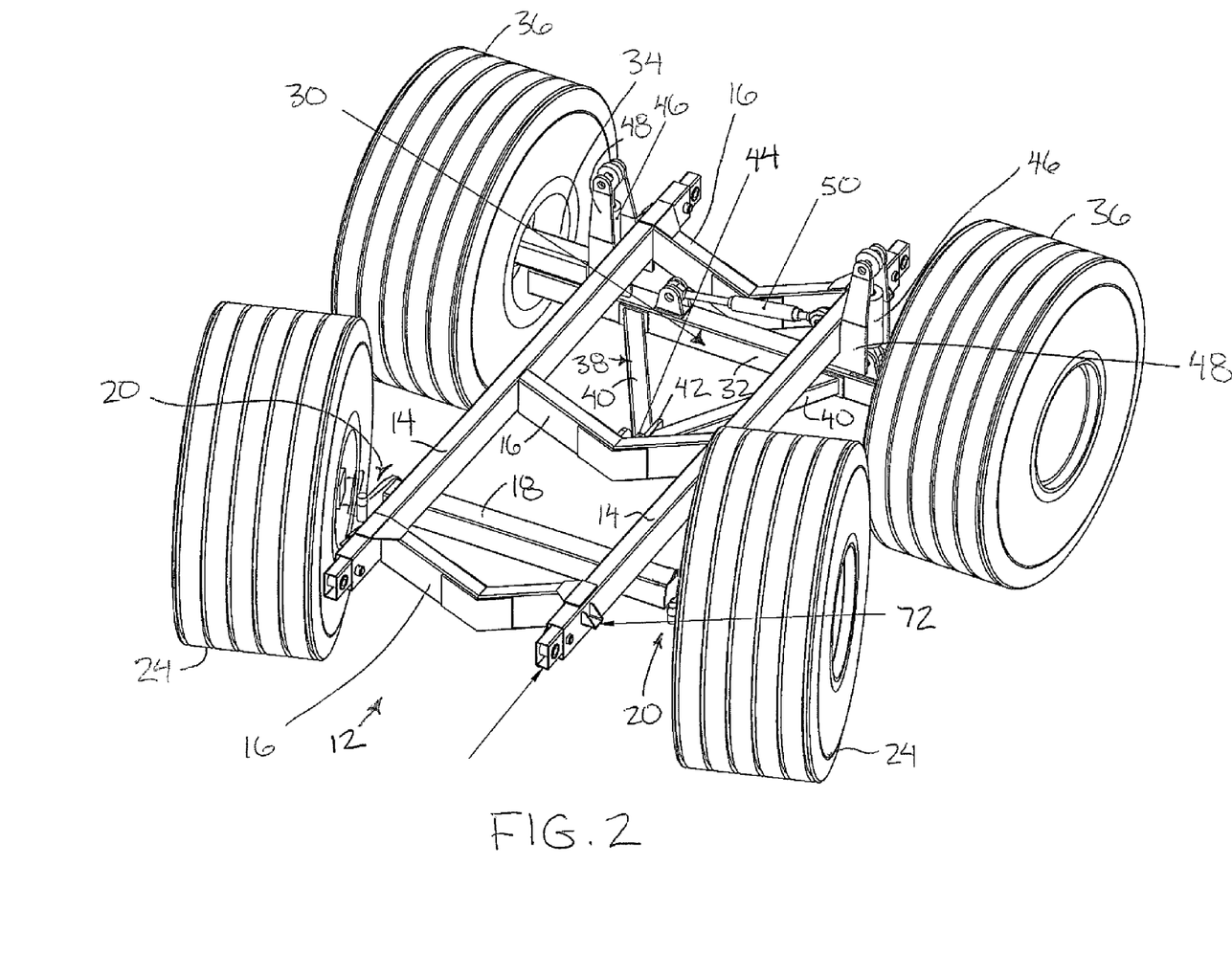
FIG. 2 is a perspective view of the main frame and the wheel assemblies supported thereon including the rear suspension mechanism.
Figure 4:
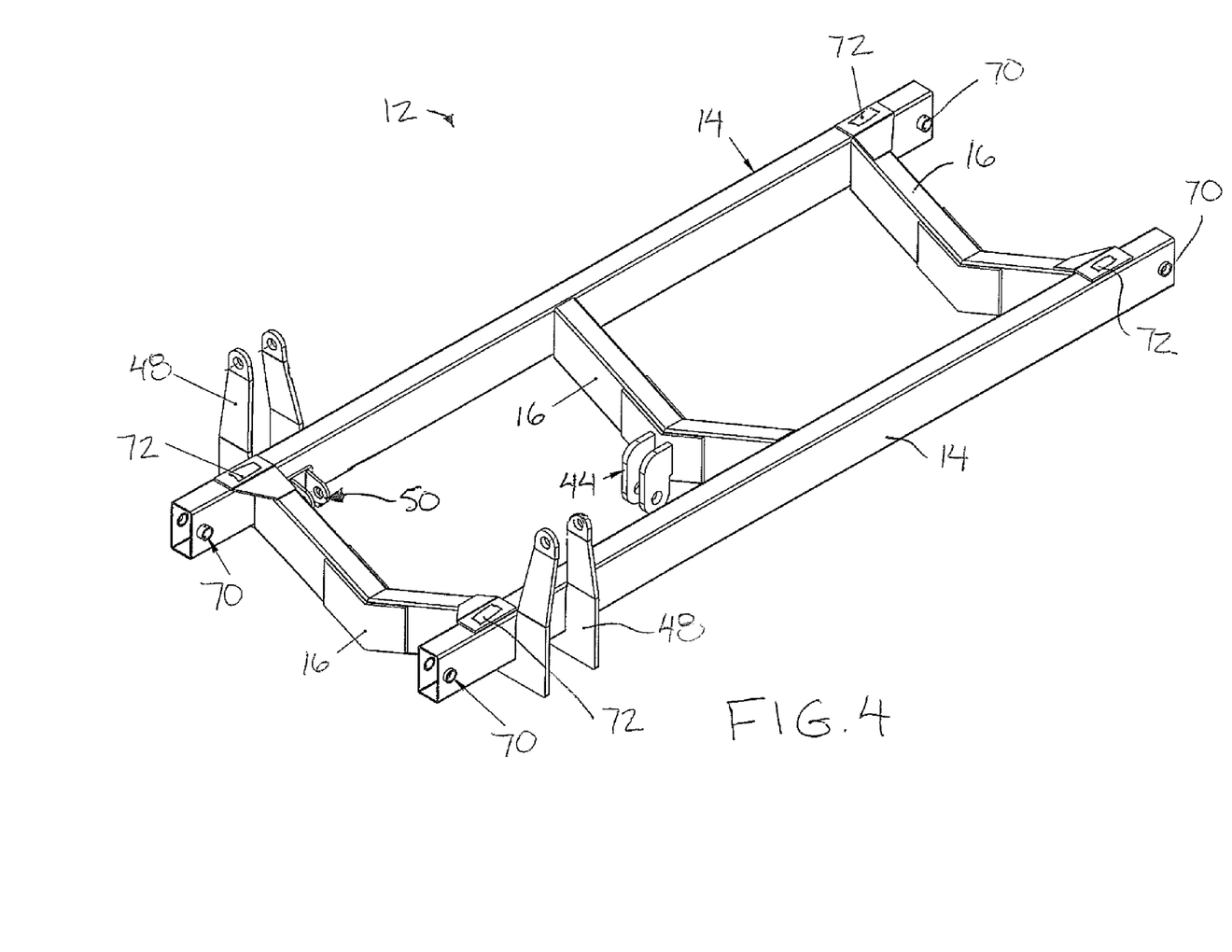
FIG. 4 is a perspective view of the main frame.
Figure 5:
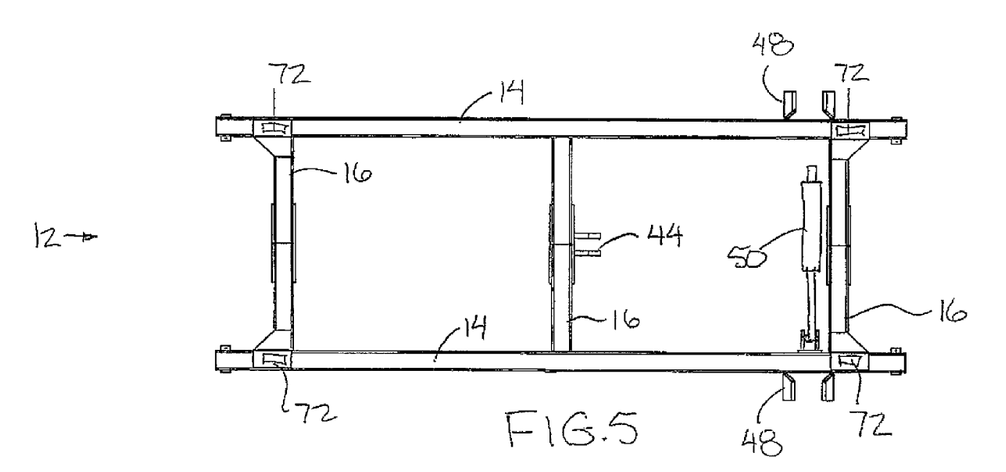
FIG. 5 and FIG. 6 are top plan and side elevational views of the main frame.
Figure 6:
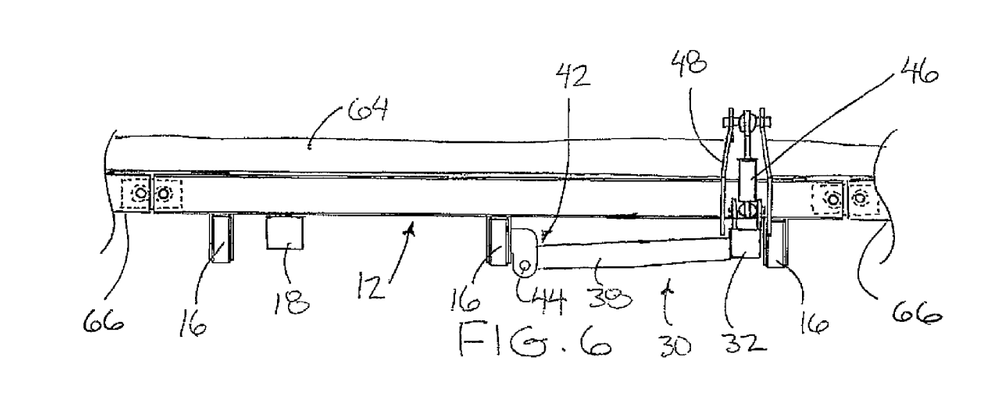
Figure 8:
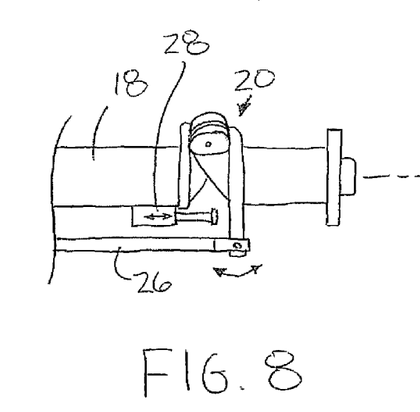
FIG. 8 is a top plan view of one of the front wheel assemblies.

The main frame further includes a front axle support member 18 in the form of a cross bar spanning in the lateral direction between the two side rails 14 in fixed relation thereto. The front cross bar spans below the two side rails and extends laterally outward beyond the side rails at each end for supporting a pair of front wheel assemblies 12 at respective opposing ends of the front axle support member. The front axle support member connects to the side rails adjacent to a forwardmost one of the cross members 16 spaced slightly rearward therefrom. Each of the front wheel assemblies is pivotally coupled to the respective end of the front axle support member such that the wheel assembly is pivotal about a respective upright steering axis 22 which is inclined upwardly and rearwardly at the front side of the support member 18.

Figure 9:
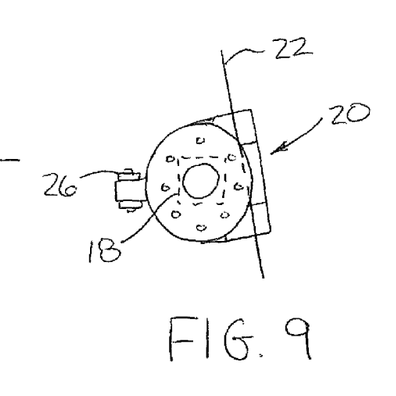
FIG. 9 is an end elevational view of the wheel assembly of FIG. 8.

Each front wheel assembly 20 includes a wheel hub arranged for supporting a respective front wheel 24 thereon such that the front wheel is rotatable about a respective front wheel axis which is horizontal and oriented substantially perpendicularly to the forward working direction in a normal forward orientation. Each front wheel axis is spaced rearward of the respective steering axis 22 such that the front wheels are arranged in a trailing type self-steering configuration. In this manner, when the cart is towed forwardly to one side, the front wheel assemblies will pivot and steer the cart to follow the towing vehicle. When towed only in the forward working direction, the trailing configuration of the front wheel axes behind the respective upright steering axes causes the wheels to return to the forward orientation. A tie rod 26 is connected to span in the lateral direction between pivotal connections to respective rear ends of the front wheel assemblies spaced rearward of the respective upright steering axes 22. The tie rod 26 is fixed in length such that the front wheel assemblies pivot together about their respective upright axes and the front wheels remain parallel to one another throughout their steering motion.

A locking mechanism is associated with the front wheels for selectively locking the front wheel assemblies in the forward orientation relative to the main frame. This is particularly suited for when it is desirable to back up the grain cart to prevent undesirable steering of the wheels when rolling in a rearward direction.

The locking mechanism generally comprises two lock members 28 supported on the opposing ends of the front axle support member inwardly of the respective wheel assemblies. Each lock member comprises an actuator operable between a retracted/unlocked position disengaged from the wheel assembly so that the wheel assembly is free to pivot and an extended/locked position in which the lock members engage inner surfaces of the respective wheel assemblies. Accordingly in the locked position, each lock member simply abuts an inner side of the respective wheel assembly at a location spaced rearward of the upright steering axis so as to prevent only inward pivoting of the respective wheel assembly towards the main frame. When the two wheel assemblies are linked by a tie rod, actuating both lock members effectively prevents pivoting of the wheel assemblies in either direction as the two lock members prevent pivoting of the wheel assemblies in opposing directions relative to one another.

Figure 3:
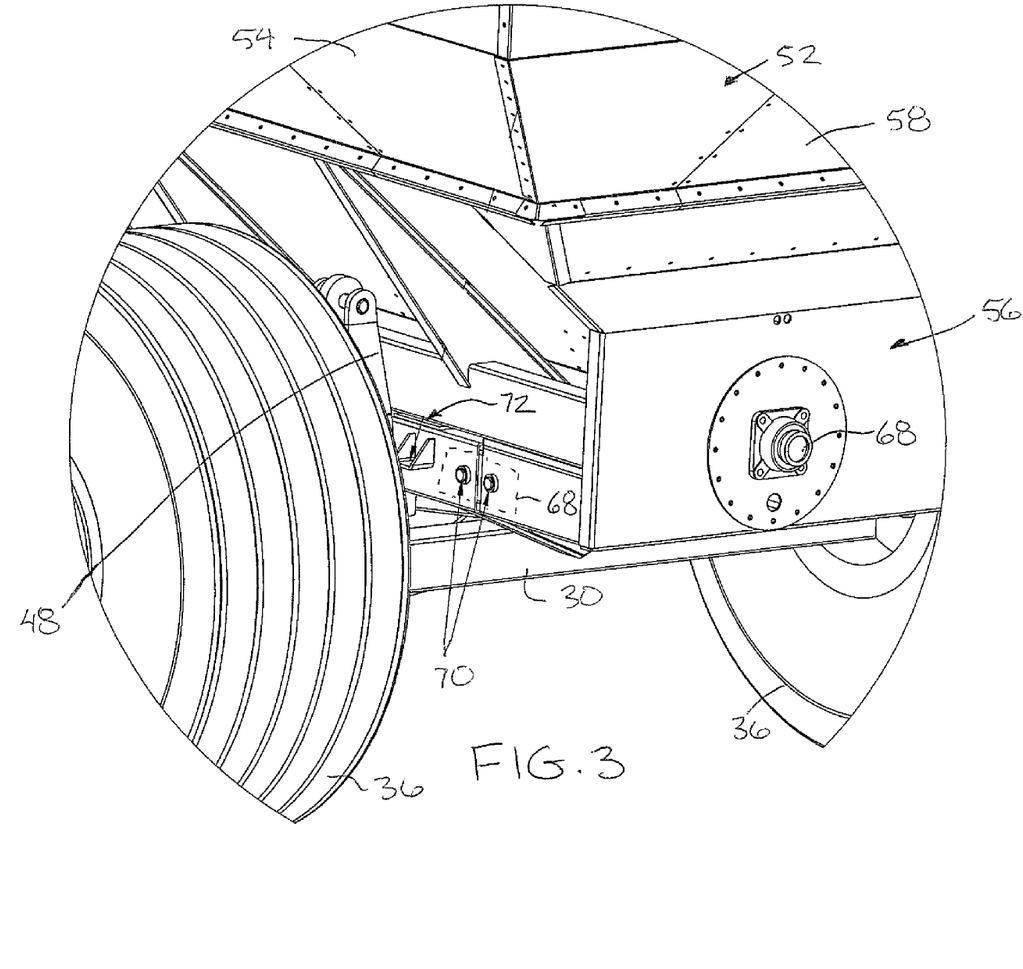
FIG. 3 is a perspective view of a portion of a rear end of the grain cart.
Figure 7:
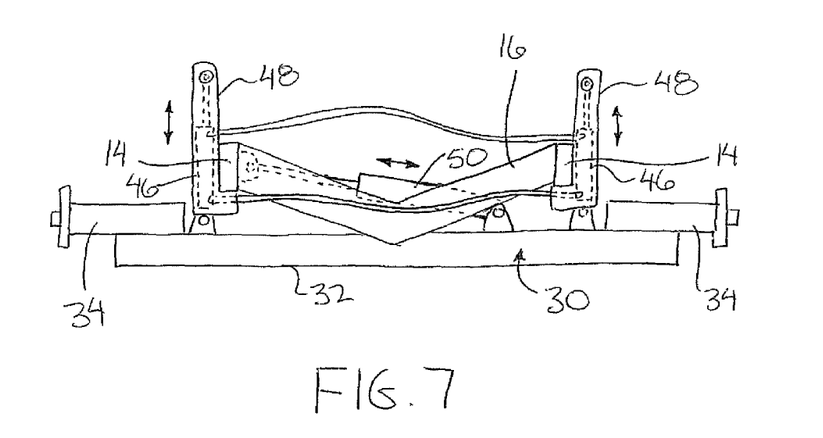
FIG. 7 is a rear elevational view of the rear suspension mechanism connected between the rear axle support member and the main frame.

The cart further comprises a rear axle support member 30 which is coupled to the main frame adjacent the rear end thereof by a rear suspension mechanism as described in further detail below. The rear axle support member 30 comprises a cross bar portion 32 spanning in the lateral direction perpendicular to the forward working direction so as to be arranged to support a rear wheel assembly 34 at each of the two opposing ends thereof. Each rear wheel assembly includes a rear wheel hub arranged to support a respective rear wheel 36 rotatably thereon for rotation about a common rear wheel axis spanning between the two rear wheels. The rear wheel assemblies are fixed in orientation relative to the cross bar which is in turn coupled to the main frame by the rear suspension such that the rear wheels remain oriented substantially in the forward working direction.

Figure 10:
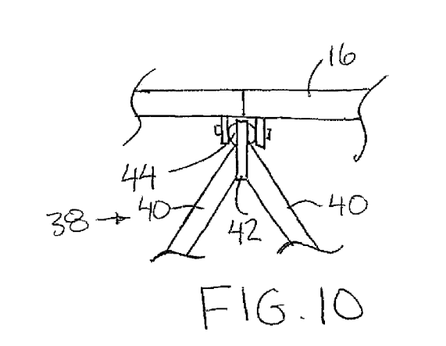
FIG. 10 is a top plan view of the pivotal connection between the front end of the connecting portion of the rear axle support member and one of the cross members of the main frame.

The rear axle support member 30 further comprises a connecting portion 38 comprising two arms 40 connected at laterally spaced apart positions on the cross bar 32 to extend horizontally forward and inward towards one another for connection to one another at an apex defining the front end 42 of the rear axle support member at a location spaced forwardly of the rear wheel assemblies on the cross bar portion 32. A pivot coupling 44 couples the front end of the rear axle support member at a central location on the cross member 16 of the main frame which is centrally located at an intermediate location between the front and rear ends. The pivot coupling includes a pivot pin spanning horizontally in the lateral direction through the front end of the rear axle support member between parallel and spaced apart mounting plates on the cross member 16. The pivot coupling 44 includes a generally spherical bushing of resilient material coupled between the front end of the support member 30 and the main frame such that a ball and socket configuration of the pivot coupling allows the rear axial support member to be supported generally for a rocking movement about a generally longitudinal axis extending longitudinally in the forward working direction.

The rear suspension mechanism comprises two suspension members 46 in the form of hydraulic piston cylinders supported in the vertical orientation between the rear axle support member 30 and the main frame. The cylinder portion of each suspension member includes a retraction port for retracting the piston when receiving the fluid therein under pressure and an extension port for extending the piston when receiving the fluid under pressure therein. The two suspension members are hydraulically linked such that the retraction ports are coupled to one another and the extension ports are coupled to one another. Accordingly, when either one of the suspension members is extended, the other member is retracted and similarly when either one of the suspension members is retracted, the other suspension member is extended.

The suspension members 46 are supported in a vertical orientation at opposing sides of the main frame such that the bottom ends are pivotally coupled at opposing ends on the cross bar portion 32 of the rear axle support member. A pair of brackets 48 fixed to the outer sides of the side rails 14 of the main frame adjacent the rear end thereof serve to pivotally couple the top ends of the respective suspension members 46 to the main frame. The pivotal connections of top and bottom ends of both suspension members to the respective brackets of the main frame and the cross bar portion of the axle support member define relative pivotal movement about respective horizontal axes oriented in the forward working direction. A bushing of resilient material is provided at each pivot coupling at the top and bottom ends of the suspension members such that some small deviation from the pivot axis is permitted at each connection.

To provide lateral stability to the rear suspension mechanism, a linear damper member 50 in the form of a suitable shock absorber member is mounted to extend generally in a lateral direction between opposing ends coupled to the rear axle support member 30 and the main frame respectively. More particularly, the linear damper extends near horizontal in orientation but at an upward inclination from one end coupled to the rear axle support member offset to one lateral side thereof to the other end coupled to the inner side of the opposing side rail 14 of the main frame.

Figure 1:
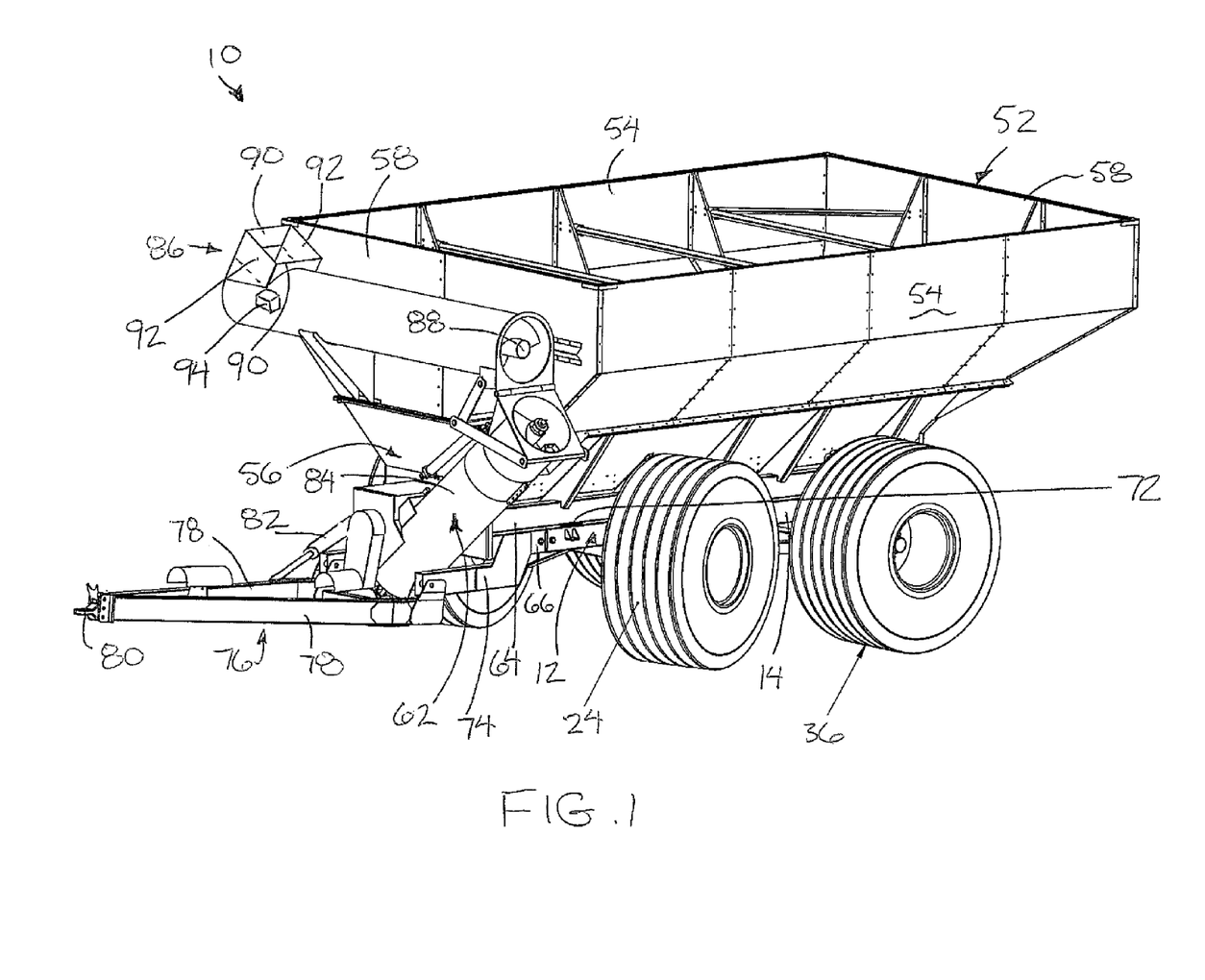
FIG. 1 is a perspective view of the grain cart.

The cart further comprises a hopper tank 52 supported on top of the main frame for receiving particulate material therein. Generally, the hopper tank comprises a pair of side walls 54 extending upwardly and outwardly from a lower trough portion 56 to an open top end of the tank defined between the side walls. The lower trough portion is received between the side rails of the main frame as accommodated by the trough shape of the cross members of the main frame.

Two end walls 58 enclose the opposing ends of the hopper tank. The trough area 56 locates a discharge auger 60 therein such that the auger discharges material from the tank along the trough area in the forward working direction to an unloading assembly 62 at the front end of the grain cart as described in further detail below.

The hopper tank further comprises a hopper frame in the form of two side rails 64 along either side of the trough area 56 to support the tank walls extending upwardly therefrom. The two side rails are parallel and spaced apart and oriented in the forward working direction so as to be supported along the top side of respective ones of the side rails of the main frame. The side rails 64 of the hopper are longer in the longitudinal direction to extend passed both ends of the side rails of the main frame.

Mounting portions 66 of the hopper frame protrude below opposing ends of the side rails 64 so as to be suitably spaced apart along the bottom of the side rail 64 so as to receive respective ones of the side rails 14 of the main frame between opposing mounting portions 66 of each side rail of the hopper frame. The inner ends of the mounting portions 66 and the outer ends of the side rails 14 of the main frame all comprise open ends of hollow tube members used in constructing the frame members.

To connect the side rails of the hopper frame to the side rails of the main frame a plurality of link members 68 are connected in a generally horizontal orientation between pivot connections at opposing ends thereof on the hopper frame and main frame respectively. More particularly, the open ends of the side rails 14 of the main frame each locate an inner end of a respective one of the link members 68 therein such that the link member is pivotally connected thereto by a suitable resilient bushing 70 to define a pivot axis therebetween oriented in the lateral direction.

The outer end of each link member is similarly received in the open inner end of a respective one of the mounting portions 66 of the hopper frame for a pivotal connection therebetween using similar resilient bushings 70 such that the pivot connections to the hopper frame are also defined about generally horizontal axes in the lateral direction. The resilient bushings 70 in each instance allow some deviation from the pivot axis.

The horizontal configuration of the link members ensures that the hopper frame remains adequately secured to the main frame in horizontal and lateral directions while the only vertical support between the hopper frame and the main frame is provided by the side rails of the hopper frame resting on the top of the side rails of the main frame.

To provide an integrated weighing function, load cells 72 are supported between the side rails of the hopper frame and the main frame such that all of the weight of the hopper and contents therein are supported through the load cells onto the main frame therebelow. In a preferred arrangement a load cell is provided adjacent opposing front and rear ends of each of the two side rails of the main frame for supporting the hopper frame on top of the main frame through a set of four load cells spaced laterally and longitudinally from one another in a generally rectangular configuration.

By locating the load cells between the side rails of the hopper frame and the main frame, the load cells are isolated from the suspension and wheel assembly components to allow a simple and effective means of recording mass of the hopper and contents therein. A suitable weight scale controller is connected in communication with all of the load cells and is arranged to convert the signal from the load cells to a corresponding weight value. The controller can be programmed such that the controller is able to subtract the mass of the empty hopper and hopper frame from the measured mass of the hopper and hopper frame with contents in the hopper frame to determine the overall mass of the contents received within the hopper.

The hopper frame further comprises two support arms 74 extending downwardly and forwardly from the front end of the hopper frame at laterally opposed sides of the cart. A hitch member 76 is coupled to the front ends of the two support arms for connection to the towing vehicle. The hitch member comprises two arms 78 having rear ends joined by a cross bar in fixed relation to one another. The rear ends of the two arms 78 are pivotally coupled to respective forward ends of the two support arms 74 such that the hitch member is pivotal about a common hitch axis which is horizontal and perpendicular to the forward working direction. The two arms 78 of the hitch member extend forwardly and inwardly to a forward apex where the two arms are connected and support a hitch connection 80 for connection to the towing vehicle.

In normal operation, the hitch member is freely pivoted about the respective hitch axis so that all of the load in the hopper is carried on the grain cart wheels. Optionally a hitch actuator 82 is provided in connection between the forward end of the hopper frame and a location on the hitch member 76 spaced forwardly of the hitch axis. The hitch actuator comprises a hydraulic piston cylinder which can be controllably extended when actuated to force the hitch arm inclination to be varied relative to the grain cart. By actuating the hitch member 76 into a controlled and set angle or inclination, the hitch member effectively transfers some of the load of the hopper frame through the hitch member to the hitch connection on the towing vehicle.

The unloading assembly 62 of the hopper generally comprises a tubular housing 84 to extend upwardly at a laterally outward inclination from an inlet connected to the discharge auger of the hopper to a discharge spout 86 at the opposing end. As shown in the illustrated embodiment, the tubular housing 84 may be hinged in two sections to allow folding of the tubular housing when not in use. The housing is arranged to receive an unloading auger 88 rotatably therein for conveying the particulate material from the discharge auger to the spout 86. The auger 88 also comprises two sections received within the two sections of the tubular housing respectively.

Figure 11:
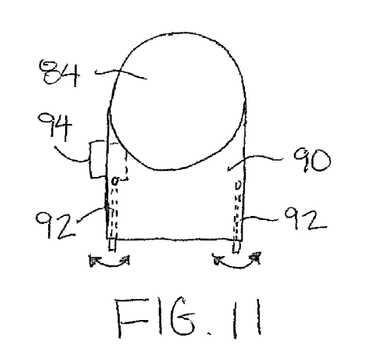
FIG. 11 is an end elevational view of the discharge spout.

The spout comprises a pair of end plates 90 which are spaced apart from one another generally in the axial direction of the auger to form inner and outer ends of a discharge opening of the spout therebetween. The spout further comprises two side plates 92 spanning perpendicularly to the end plates 90 at opposing sides of the discharge opening. Each side plate 92 spans between the inner and outer end plates 90 and is coupled to the tubular housing 84 by a pivotal connection such that each side plate is pivotal about a respective pivot axis oriented perpendicularly to the end plates. A link connected between the two side plates ensure that the two side plates pivot together about their respective pivot axes. A spout actuator 94 is coupled to the side plates to control the position of the side plates. By pivoting the side plates together about their respective pivot axes, the orientation of the discharge opening defined by the spout is effectively angularly adjusted in orientation generally about the longitudinal direction of the tubular housing.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A grain cart for connection to a towing vehicle for movement therewith in a forward working direction, the grain cart comprising:
   a main frame;
   a pair of front wheel assemblies including respective front wheels supported at opposing sides of the main frame so as to be arranged for pivotal movement relative to the main frame about respective upright steering axes;
   a hopper supported on the main frame so as to be arranged to receive particulate material therein;
   a hitch arm having a front end arranged for connection to a towing vehicle and a rear end supported for pivotal movement relative to the main frame about a substantially horizontal hitch axis oriented perpendicularly to the forward working direction;
   a rear axle support member supporting a pair of rear wheel assemblies including respective rear wheels thereon such that the rear wheels are fixed in orientation; and
   a rear suspension mechanism coupling the rear axle support member to the main frame at a position spaced rearward from the front wheel assemblies such that the rear wheels are oriented for rolling movement in the forward working direction and such that the rear axle support member is generally arranged for rocking movement about a longitudinal axis oriented in the forward working direction relative to the main frame wherein:
   the rear suspension mechanism comprises a pair of hydraulic suspension members coupled between the main frame and the rear axle support member at opposing sides of the main frame such that each hydraulic suspension member is pivotally coupled at opposing ends to the axle support member and the main frame respectively for relative pivotal movement about respective axes oriented generally in the forward working direction;
   the hydraulic suspension members each comprise a piston received in a cylinder so as to be arranged for linear extension and retraction;
   the hydraulic suspension members are connected to one another such that extension of a first one of the hydraulic suspension members corresponds to retraction of a second one of the hydraulic suspension members and retraction of the first one of the hydraulic suspension members corresponds to extension of the second one of the hydraulic suspension members; and
   the rear suspension mechanism further comprises a linear damper member coupled between the rear axle support member and the main frame which extends in a generally lateral direction oriented to extend between opposing sides of the main frame.

2. The grain cart according to claim 1 wherein the front wheels are freely pivotal about the respective upright steering axes and the front wheels are supported by the respective front wheel assemblies for rolling movement about respective front wheel axes which are spaced rearwardly from the respective upright steering axes such that the front wheels are arranged in a trailing self-steering configuration when the grain cart is towed in the forward working direction.

3. The grain cart according to claim 1 wherein the suspension members are coupled to the main frame by resilient bushing members.

4. The grain cart according to claim 1 wherein the rear axle support member comprises a crossbar supporting the rear wheel assemblies at opposing ends thereof and a connecting portion extending forwardly from the crossbar in fixed relation thereto to a front end pivotally connected to the main frame at a location spaced forwardly from the rear suspension members.

5. The grain cart according to claim 4 wherein the front end of the connecting portion is coupled to the main frame by a resilient bushing so as to allow relative pivotal movement about the longitudinal axis oriented in the forward working direction.

6. The grain cart according to claim 1 further comprising:
   a plurality of load cells received between the hopper frame and the main frame; and
   a scale controller in communication with the plurality of load cells so as to be arranged to determine a weight of material in the hopper.

7. The grain cart according to claim 6 wherein the hopper frame is connected to the main frame by a plurality of substantially horizontal link members which are pivotally coupled at opposing ends to the hopper frame and the main frame respectively such that the link members provide no support to the hopper frame in a vertical direction.

8. The grain cart according to claim 7 wherein the link members are coupled to the hopper frame and the main frame by resilient bushings.

9. The grain cart according to claim 1 further comprising a hitch actuator comprising a hydraulic piston cylinder connected between the main frame and the hitch arm so as to be arranged to fix orientation of the hitch arm at a selected one of a plurality of angular positions about the horizontal hitch axis which corresponds to a selected inclination of the hitch arm.

10. The grain cart according to claim 1 wherein:
the main frame comprises a pair of side rails extending in the forward working direction parallel and spaced apart from one another and a front axle support member spanning in a lateral direction between the side rails and supporting the front wheel assemblies on opposing ends thereof; and
the rear axle support member comprises a crossbar extending in the lateral direction and supporting the rear wheel assemblies at opposing ends thereof and a connecting portion extending forwardly from the crossbar to a front end pivotally coupled to the main frame at an intermediate location between the front and rear axle support members; and a linear damper member is coupled between the rear axle support member and the main frame so as to extend generally in the lateral direction.

11. The grain cart according to claim 1 further comprising an unloading auger assembly including a tubular housing supporting an auger rotatably therein and a discharge spout at one end of the housing, wherein at least a portion of the discharge spout is angularly adjustable generally about an axis oriented in a longitudinal direction of the tubular housing so as to be arranged for controlling a discharge orientation of the unloading auger assembly.

12. The grain cart according to claim 11 wherein:
the discharge spout comprises a pair of parallel and axially spaced apart end plates and a pair of substantially parallel and spaced apart side plates extending between the end plates to define a discharge opening of the spout therebetween;
the side plates are pivotally coupled to the housing such that the side plates are pivotal about respective pivot axes oriented substantially perpendicularly to the end plates; and
an actuator is coupled to the side plates such that an orientation of the side plates relative to the tubular housing is controllable by the actuator.

13. A grain cart for connection to a towing vehicle for movement therewith in a forward working direction, the grain cart comprising:
a main frame;
a pair of first wheel assemblies including respective first wheels supported at opposing sides of the main frame so as to be arranged for pivotal movement relative to the main frame about respective upright steering axes;
a hopper supported on the main frame so as to be arranged to receive particulate material therein;
a hopper frame supporting the hopper on the main frame;
a hitch arm having a front end arranged for connection to a towing vehicle and a rear end supported for pivotal movement relative to the main frame about a substantially horizontal hitch axis oriented perpendicularly to the forward working direction;
an axle support member supporting a pair of second wheel assemblies including respective second wheels thereon such that the second wheels are fixed in orientation; and
a suspension mechanism coupling the axle support member to the main frame at a position spaced in the working direction from the first wheel assemblies such that the second wheels are oriented for rolling movement in the forward working direction and such that the axle support member is generally arranged for rocking movement about a longitudinal axis oriented in the forward working direction relative to the main frame;
one of the hopper frame and the main frame comprising longitudinally opposed mounting portions protruding vertically therefrom and another one of the hopper frame and the main frame comprising a main frame portion received longitudinally between the longitudinally opposed mounting portions of the other frame;
a plurality of link members pivotally coupled at opposing ends to the main frame portion of one frame and a respective one of the mounting portions of the other frame respectively so as to be oriented generally horizontally such that the link members provide no support to the hopper frame in a vertical direction;
a plurality of load cells received between the hopper frame and the main frame; and
a scale controller in communication with the plurality of load cells so as to be arranged to determine a weight of material in the hopper.

14. The grain cart according to claim 13 wherein the mounting portions and the main frame portion each comprise a tubular member with an open end, the link members being received at opposing ends to within the open ends of the tubular members of the hopper frame and the main frame respectively such that the link members provide no support to the hopper frame in a vertical direction.

15. A grain cart for connection to a towing vehicle for movement therewith in a forward working direction, the grain cart comprising:
a main frame;
a pair of front wheel assemblies including respective front wheels supported at opposing sides of the main frame so as to be arranged for pivotal movement relative to the main frame about respective upright steering axes which are inclined upwardly and rearwardly;
a hopper supported on the main frame so as to be arranged to receive particulate material therein;
a hitch arm having a front end arranged for connection to a towing vehicle and a rear end supported for pivotal movement relative to the main frame about a substantially horizontal hitch axis oriented perpendicularly to the forward working direction;
a rear axle support member supporting a pair of rear wheel assemblies including respective rear wheels thereon such that the rear wheels are fixed in orientation; and
a rear suspension mechanism coupling the rear axle support member to the main frame at a position spaced rearward from the front wheel assemblies such that the rear wheels are oriented for rolling movement in the forward working direction and such that the rear axle support member is generally arranged for rocking movement about a longitudinal axis oriented in the forward working direction relative to the main frame;
wherein the front wheel assemblies are freely pivotal about the respective upright steering axes and the front wheels are supported by the respective front wheel assemblies for rolling movement about respective front wheel axes which are spaced rearwardly from the respective upright steering axes such that the front wheels are arranged in a trailing self-steering configuration when the grain cart is towed in the forward working direction.

16. The grain cart according to claim 15 wherein there is provided a locking mechanism arranged to selectively lock the front wheel assemblies such that the front wheels are fixed for rolling movement only in the forward working direction.

\* \* \* \* \*